United States Patent Office 2,815,174
Patented Dec. 3, 1957

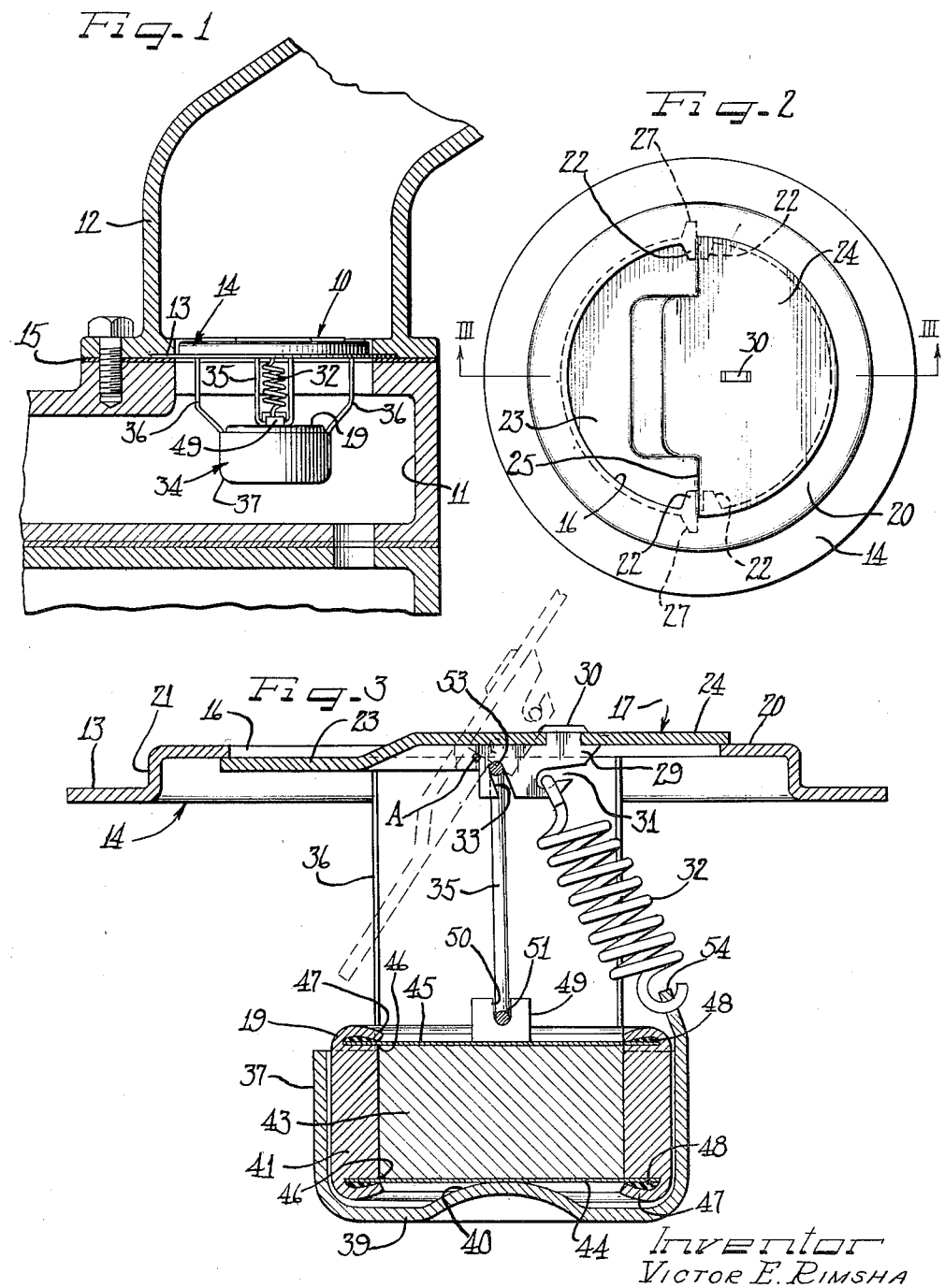
Inventor
Victor E. Rimsha

2,815,174

COOLING RADIATOR THERMOSTATIC VALVE

Victor E. Rimsha, Chicago, Ill., assignor to The Dole Valve Company, Chicago, Ill., a corporation of Illinois Application September 3, 1954, Serial No. 454,071

3 Claims. (Cl. 236—34)

This invention relates to improvements in thermostatically operated valves of the butterfly type particularly adapted for use in the cooling systems of internal combustion engines.

A principal object of my invention is to provide a simple and improved form of thermostatically operated valve for the cooling system of an internal combustion engine of a simpler and more efficient form than such valves now in use.

Another object of my invention is to provide a thermostatically operated valve particularly adapted for use in the cooling systems of internal combustion engines in which opening of the valve is attained by utilizing a thermostatic element which is expansible in opposite directions and has sufficient power to operate under substantial loads.

A further object of my invention is to simplify the thermostatically operated butterfly valves heretofore used in the cooling systems of internal combustion engines by loosely mounting the thermostatic element for the valve in a seating member and providing a simple and positive drive connection between the thermostatic element and the butterfly valve.

Still another object of my invention is to provide a thermostatic valve of the class described wherein the thermostatic element is selected for its power to open the valve under substantial loads with a relatively short travel of the thermostatic element.

A still further object of my invention is to provide a thermostatically operated butterfly valve in which the possibility of the valve freezing closed is avoided by providing a thermostatic element in direct association with the valve, in which a thermally expansible material is confined in a casing between two flexible metallic diaphragms or disks of sufficient area to provide relatively great power to operate the butterfly valve with a relatively small travel of the disks.

A still further object of my invention is to provide a butterfly type of thermostatically operated valve for the cooling system of an internal combustion engine and operated by a power type of thermostatic element, in which thermostatic element is loosely carried in a seating member and has parallel spaced flexible metallic diaphragms, one reacting against said seating member and the other reacting against a drive link connected between the diaphragm and valve.

These and other objects of my invention will appear from time to time as the following specification proceeds and with reference to accompanying drawings wherein:

Figure 1 is a fragmentary sectional view taken through a part of the water jacket and cooling duct of an internal combustion engine showing a thermostatically operated butterfly valve constructed in accordance with my invention associated therewith;

Figure 2 is a plan view of the thermostatically operated valve shown in Figure 1; and Figure 3 is a transverse sectional view taken substantially along line 3—3 of Figure 2.

In the embodiment of my invention illustrated in the drawing, I have shown a thermostatically operated butterfly valve generally indicated at 10 in association with a water jacket 11, formed in the cylinder head of an internal combustion engine, and a main discharge cooling duct 12 bolted or otherwise secured to the cylinder head. The cooling duct 12 is shown as engaging an annular flange 13 of a housing or casing 14 for the valve and retaining said flange in engagement with a gasket 15 interposed between said cooling duct and cylinder head. The casing 14 has a port opening 16 in communication with the discharge outlet duct 12. A valve 17 is pivotally mounted on the casing 14 to control the passage of cooling water therethrough. Said valve is herein shown as being a butterfly valve and opens under predetermined increases in temperature of the cooling fluid for the internal combustion engine when the temperature of the cooling fluid reaches the operating range of a thermostatic element 19.

The valve housing or casing 14 may be made from a metal stamping, stamped from a sheet or plate of brass or other suitable material, and is herein shown as having a relatively flat upper annular surface 20, the inner margin of which forms the port or valve opening 16. The flange 13 is shown as extending parallel to the annular surface 20 and as being stepped downwardly therefrom by a right angled wall portion 21.

The port opening 16, as shown in Figure 2, is generally circular in form and divided into two halves, at the junction of which are spaced inwardly extending nibs 22, 22. The spaces between said nibs form diametrically opposed slots disposed in a straight line which defines the pivotal bearing area of the valve 17.

The valve 17 may likewise comprise a metallic stamping and may be similar to the valve shown in the Brown Patent No. 2,493,336 dated January 10, 1950, although it need not be such a valve and may be of various other forms desired.

As shown in Figures 2 and 3, the valve comprises two vertically off-set relatively flat wing portions 23 and 24 connected together by an intermediate section 25, extending generally at right angles to the wing portions 23 and 24 and spacing said wing portions apart in generally parallel relation with respect to each other.

The height of the intermediate right angled section 25 of the butterfly valve is determined by the thickness of the annular portion of the casing defining the valve opening, and is such that one wing portion extends along the top side of the annular surface 20 of the valve casing and the other wing portion extends along the bottom side of said annular surface, when the valve is closed, as shown in Figure 3.

Two ears 27, 27 are shown as extending oppositely from the wing portion 23 of the valve 17 adjacent the right angled portion 25 thereof. These ears extend laterally beyond the margins of the port opening 16 and abut the bottom of the annular portion 20 defining the port opening. The marginal edges of the ears 27, 27 come into engagement with the undersurface of the annular portion 20 upon complete opening of the valve, to retain the valve in position as is usual with valves of the shaftless butterfly type.

Thus when the valve 17 is inserted through the slots defined by the inner margins of the inwardly extending nibs 22, 22 with the right angled portion 25 of the valve having engagement with said slot, the valve may be pivoted about this right angled portion to open or close the port opening 16.

A connecting or operating ear 29 is shown as depending from the wing portion 24 and as being riveted thereto, as indicated by reference character 30. The connecting ear 29 extends along the wing portion 24 in a generally radial direction in advance of the pivot of the valve and has a downwardly spaced radially opening slot 31, formed therein and recessed inwardly of the open end of said slot to form a connector for a return spring 32.

The lug 29 also has an inclined downwardly opening slot 33 within which extends a power or drive link 35 for opening the valve upon increases in temperature, as will hereinafter be more fully described as this specification proceeds.

The valve housing or casing is also shown as having a seating member 34 for the thermostatic element 19 and shown in Figure 1 as extending within the water jacket 11 of the cylinder head. The seating member 34 is shown as having two parallel spaced arms 36, 36 suitably secured to the annular portion 20 of the valve housing and depending therefrom. The lower end portions of arms 36, 36 are shown as extending angularly inwardly and terminating into the wall of a cup-like retainer 37, opening toward the port opening 16 and forming a seating member or retainer for the thermostatic element 19.

The cup-like retainer 37 is shown as having a bottom wall 39 having a convex bearing engaging portion 40 extending therein toward the open end of said retainer, and herein shown as being pressed within the bottom of said retainer and forming a pivotal bearing area for the thermostatic element 19.

The thermostatic element 19 is shown as being of the same general type of thermostatic element as is shown in an application Serial No. 399,947 filed by Samuel G. Eskin on December 23, 1953 and entitled "Thermal Responsive Unit" and comprises a casing 41 generaly cylindrical in form and containing a thermally expansible material 43, which may, by way of example, be a metallic wool, such as a copper or aluminum wool having a fusible material filling the spaces therebetween and expansible on fusion and being fusible in the operating range of the device. One form of fusible material of particular advantage is a microcrystalline wax.

Other thermally expansible or fusible materials are crystalline materials having a plastic or elastic binding material in solution and having finely divided particles of a solid heat conducting material dispersed through and coated with the solution, so that the finely divided solid heat conducting particles are bound together by the binder in a solid body. A material of this type is described in United States Patent 2,259,846 so need not herein be described further.

The thermally expansible material 43 is retained within the wall of the casing 41 by two parallel spaced thin metallic diaphragms or disks 44 and 45. As herein shown, the disks 44 and 45 abut opposite shouldered end portions 46 of the wall of the casing 41 and extend therealong a substantial distance. The disks 44 and 45 are retained to the shouldered end portions 46 of the casing wall by the spinning of thin wall sections 47 over annular gaskets 48. Each gasket 48 engages the top surface of an associated disk 44 or 45 and is held in tight engagement therewith by the spun or bent wall section 47 to provide a tight seal between the casing wall and the associated diaphragm or disk, and to accommodate the diaphragms to be extended with respect to the casing when the fusible material 43 reaches its fusion point in the operating range thereof.

The casing 41 of the thermostatic element 19 is shown as fitting rather loosely within the wall of the cup-like retainer or seating member 37 with the thin metal diaphragm or disk 44 having rocking bearing engagement with the convex bearing area 40 of the bottom 39 of the retainer 37.

The upper diaphragm or disk 45 is shown as having a yoke 49 secured thereto at the center thereof, and extending upwardly therefrom. The yoke 49, as shown in Figure 1, is relatively wide and has an upwardly opening slot 50 formed therein, for receiving the drive link 35 and exerting pressure against said link to open the valve 17 when the temperature of the cooling liquid in the water jacket 11 comes within the operating range of the thermostatic element 19.

The drive or operating link 35 is shown as being in the form of a closed link having a relatively wide bottom portion 51 engaging within the slot 50 and a corresponding relatively wide upper portion 53 engaging within the slot 33. The slot 33 is further shown as being inclined away from the pivot point of the valve to retain the link 35 in an upright position when pressure is relieved from said link.

The pivot point of the butterfly valve 17 is indicated by reference character A and is spaced relatively close to the point of engagement of the link 35 with the slot 33, located substantially at the inner margin of the nibs 22 engaging the vertical wall portion 25. The point of engagement of the link 35 with the slot 33 is thus off-set from the pivot point A of the valve and is between the point of connection of the spring 32 thereto so that when the cooling liquid has heated the thermally expansible material 43 to its fusion point in the operating range of the thermostat, the expansion of the oppositely disposed diaphragms 44 and 45 will open the valve against the tension spring 32 and will maintain the valve open.

The tension spring 32 is shown as being hooked at its lower end through an upright ear 54, extending upwardly from the wall of the seating member or retainer 37. The ear 54 is so located with respect to the point of connection of the spring 32 to the slot 31 that the spring 32 will exert a constant force on the valve in a valve closing direction and will also react against the link 35 to maintain the diaphragm 44 in bearing engagement with the concave bearing area 40, and to return the diaphragms 44 and 45 to the retracted positions as shown in Figure 3, in cases where the diaphragms may be extended beyond their dead center positions.

It should here be understood that since the diaphragms 44 and 45 are made of a thin flexible metal, they will return to their inwardly biased positions of their own resiliency and will return the thermally expansible material when the operating temperature of the cooling fluid is below the fusion range of the thermally expansible material.

It may be seen from the foregoing that I have provided an extremely simple thermostatic element for controlling the temperature of the cooling fluid of an internal combustion engine in which the danger of over extension of the thermostatic element is overcome by providing a thermostatic element in which a relatively large surface area is in engagement with the thermally expansible material of the element and in which the thermally expansible material expands in opposite directions with relatively high power and a relatively small degree of movement, and yet efficiently opens the thermostatic valve and holds the same open as required.

It may further be seen that the construction of the butterfly valve is such that the usual retainers or fastening means for the thermostatic element are eliminated and that the thermostatic element need merely be placed within its seating member and the drive link 35 placed in engagement therewith in the slot 50 and in engagement with the downwardly facing slot 33 on the butterfly valve 17, prior to connecting the spring 32 to the valve, by a simple side sliding action.

It may also be seen that the thermostatic element is rockingly mounted on one of its power members to accommodate a certain freedom of movement of the thermostatic element with respect to its seating member or container, and to exert a pressure on the diaphragm 44 in direct alignment with the point of application of pressure to the drive link 35.

It will be understood that various modifications and variations of the present invention may be effected without departing from the spirit and scope of the novel concepts thereof.

I claim as my invention:

1. In a thermostatic valve structure for association with the cooling duct of a internal combustion engine, a casing having a port opening, a butterfly valve pivotally supported by said casing for controlling the passage of coolant through said port opening, said casing having a seating portion spaced upstream from said port opening having a bottom wall facing said port opening and having a central convex bearing portion extending from said bottom wall towards said port opening and having a cylindrical wall extending from said bottom wall toward said port opening, a spring connected between said seating portion and said butterfly valve and biasing said butterfly valve in a closed position, an oppositely acting thermostatic element loosely carried in said seating portion for slidable movement along said wall and having a casing having an extensible diaphragm having pivotal engagement with said convex portion and acting thereagainst, a second extensible diaphragm cooperating with said first diaphragm to retain a fusible thermally expansible material within said casing and extensible with respect to to said casing in an opposite direction from said first mentioned extensible diaphragm upon fusion of the fusible thermally expansible material contained within said casing, and a drive link loosely connected at one end with said second extensible diaphragm and loosely connected at its opposite end with said butterfly valve at a point offset from the pivot thereof, for pivoting said valve to an open position upon fusion of the thermally expansible material contained within said casing and extension of said diaphragms with respect thereto, said drive link maintaining said first mentioned extensible diaphragm in engagement with said convex bearing portion, upon valve closing movement by the bias of said spring.

2. In a thermostatic valve structure for association with the cooling duct of an internal combustion engine, a casing having a port opening, a butterfly valve pivotally supported by said casing for controlling the passage of coolant through said port opening, said casing having a seating portion spaced upstream from said port opening and having a bottom wall facing said port opening having a convex central bearing portion extending toward said port opening, a spring connected between said seating portion and said butterfly valve and biasing said butterfly valve into a closed position, a thermostatic element comprising a casing containing a fusible thermally expansible material and spaced flexible metal diaphragms retaining the thermally expansible material within said casing and forming the power members of the thermostatic element, a slidable guiding connection between said casing and said seating portion, one of said diaphragms having bearing engagement with said convex central portion of said seating portion, and a drive link loosely connected at one end with the other of said diaphragms and loosely connected at its opposite end with said butterfly valve, for pivoting said valve to an open position upon increases in temperature of the coolant to the fusion point of said thermally expansible material.

3. In a thermostatic valve structure for association with the cooling duct of an internal combustion engine, a casing having a port opening, a butterfly valve pivotally supported by said casing for controlling the passage of coolant through said port opening, said casing having a seating portion spaced downstream from said port opening having a receptacle having a generally cylindrical wall opening toward said port opening and having a closed bottom extending across said wall having a convex central portion facing said port opening, a spring connected between said receptacle and valve and biasing said valve into a closed position, a thermostatic element comprising a casing having flexible diaphragms closing the opposite ends thereof and containing a fusible thermally expansible material within said casing, said casing having slidable engagement with said cylindrical wall and one of said diaphragms having bearing engagement with said convex central portion, the other of said diaphragms having a yoke thereon having a slot facing said butterfly valve, a slotted lug secured to said butterfly valve and extending therefrom toward said yoke, and having a slot therein forming a connector for said spring and having a second slot therein opening toward said yoke, and a drive link having one end engageable with said slot in said yoke on said diaphragm and engaging said second slot in said lug extending from said butterfly valve at its opposite end and retained to said slots by said spring and forming a drive member for said thermostatic element to pivot said valve in a valve opening direction upon fusion of the thermally expansible material contained within said casing.

References Cited in the file of this patent

UNITED STATES PATENTS

| 823,632 | Packard | June 19, 1906 |
| 1,542,088 | Post | June 16, 1925 |
| 1,607,745 | Palm | Nov. 23, 1926 |
| 1,763,802 | Levy | June 17, 1930 |
| 2,102,201 | Durant | Dec. 14, 1937 |
| 2,128,274 | Vernet | Aug. 30, 1938 |
| 2,656,113 | Drapeau | Oct. 20, 1953 |

FOREIGN PATENTS

| 11,632 | Great Britain | 1887 |